(12) United States Patent
Haeg et al.

(10) Patent No.: US 6,257,055 B1
(45) Date of Patent: Jul. 10, 2001

(54) LOADING ASSEMBLY FOR A VEHICLE SPINDLE TEST FIXTURE

(75) Inventors: Steven R. Haeg, Shorewood; Ricky L. Zieman, Chaska, both of MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/304,910

(22) Filed: May 4, 1999

(51) Int. Cl.[7] .......................... G01M 19/00; G01M 17/00
(52) U.S. Cl. ................................ 73/118.1; 73/669
(58) Field of Search .................... 73/669, 118.1, 73/856

(56) References Cited

U.S. PATENT DOCUMENTS

| | | | |
|---|---|---|---|
| 3,028,761 | 4/1962 | Cole, Jr. | 74/69 |
| 3,713,330 | 1/1973 | Lentz | 73/93 |
| 4,016,754 | 4/1977 | Wiss | 73/117.3 |
| 4,133,201 | 1/1979 | Klinger | 73/12 |
| 4,263,809 | 4/1981 | Petersen et al. | 73/798 |
| 4,501,139 | 2/1985 | Petersen | 73/118 |
| 4,567,782 | 2/1986 | Speicher et al. | 74/96 |
| 4,658,656 | 4/1987 | Haeg | 73/669 |
| 4,733,558 | 3/1988 | Grenier | 73/118.1 |
| 4,977,791 | 12/1990 | Erichsen | 74/470 |
| 4,981,034 | 1/1991 | Haeg | 73/118.1 |
| 5,083,453 | * 1/1992 | Daley | 73/118.1 |
| 5,088,320 | 2/1992 | Fukuda et al. | 73/118.1 |
| 5,131,267 | 7/1992 | Fukuda et al. | 73/118.1 |
| 5,241,856 | 9/1993 | Petersen et al. | 73/118.1 |
| 5,465,615 | * 11/1995 | Petersen et al. | 73/118.1 |

* cited by examiner

Primary Examiner—Benjamin R. Fuller
Assistant Examiner—Maurice Stevens
(74) Attorney, Agent, or Firm—Westman, Champlin & Kelly, P.A.; S. Koehler

(57) ABSTRACT

A loading assembly used in a vehicle spindle text fixture to apply a lateral force parallel to a spindle axis of a vehicle spindle includes a support frame and a wheel adapter housing mountable to the vehicle spindle. A pair of vertical struts are pivotally joined to the wheel adapter housing. A first actuator is operably coupled to the vertical struts to apply a force along a vertical axis substantially perpendicular to the spindle axis and substantially perpendicular to a longitudinal axis of the vehicle. A pair of lateral struts are provided. Each lateral strut is pivotally joined to one of the vertical struts. A second actuator is operably coupled to the lateral struts to apply a lateral force.

5 Claims, 6 Drawing Sheets

LOADING ASSEMBLY FOR A VEHICLE SPINDLE TEST FIXTURE

BACKGROUND OF THE INVENTION

The present invention relates to loading assemblies used for testing portions of a vehicle. More particularly, the present invention relates to a loading assembly for applying at least one of a lateral force, a steer moment and a camber moment to the vehicle spindle.

Many test fixtures have been advanced to apply forces and moments to a vehicle spindle in order to simulate driving or road conditions. These test fixtures often include separate actuators to apply substantially independent vertical, longitudinal and lateral forces as well as a braking moments to the vehicle spindle. U.S. Pat. Nos. 4,733,558 and 5,083,453 disclose two such test fixtures.

Commonly, the test fixtures include a wheel adapter housing that is mounted to the vehicle spindle. Two vertical struts are joined to the perimeter of the wheel adapter housing and are used to transfer the longitudinal forces, the vertical forces and the braking moments to the vehicle spindle. A center downwardly projecting tang located between the vertical struts and also joined to the perimeter of the wheel adapter housing is joined to a lateral strut, which is used to transmit lateral force developed from an actuator.

Although the above-identified test fixtures are quite capable of applying longitudinal forces, vertical forces, lateral forces and braking moments to the vehicle spindle, adaptation of the test fixtures in order to apply either steer moments or camber moments to the vehicle spindle is not easy. U.S. Pat. No. 5,465,615 describes a test fixture for applying steer and camber moments. In this fixture, a plurality of struts connect to the wheel adapter at spaced-apart locations in order to develop the desired moments. However, vehicle fender well sheet metal can create severance clearance problems that make application of the fixture to some vehicles difficult.

SUMMARY OF THE INVENTION

A loading assembly used in a vehicle spindle text fixture to apply a lateral force parallel to a spindle axis of a vehicle spindle includes a support frame and a wheel adapter housing mountable to the vehicle spindle. A pair of vertical struts are pivotally joined to the wheel adapter housing. A first actuator is operably coupled to the vertical struts to apply a force along a vertical axis substantially perpendicular to the spindle axis and substantially perpendicular to a longitudinal axis of the vehicle. A pair of lateral struts are provided. Each lateral strut is pivotally joined to one of the vertical struts. A second actuator is operably coupled to the lateral struts to apply a lateral force.

DETAILED DESCRIPTION OF THE PREFERRED EMBODIMENTS

Figure 1:
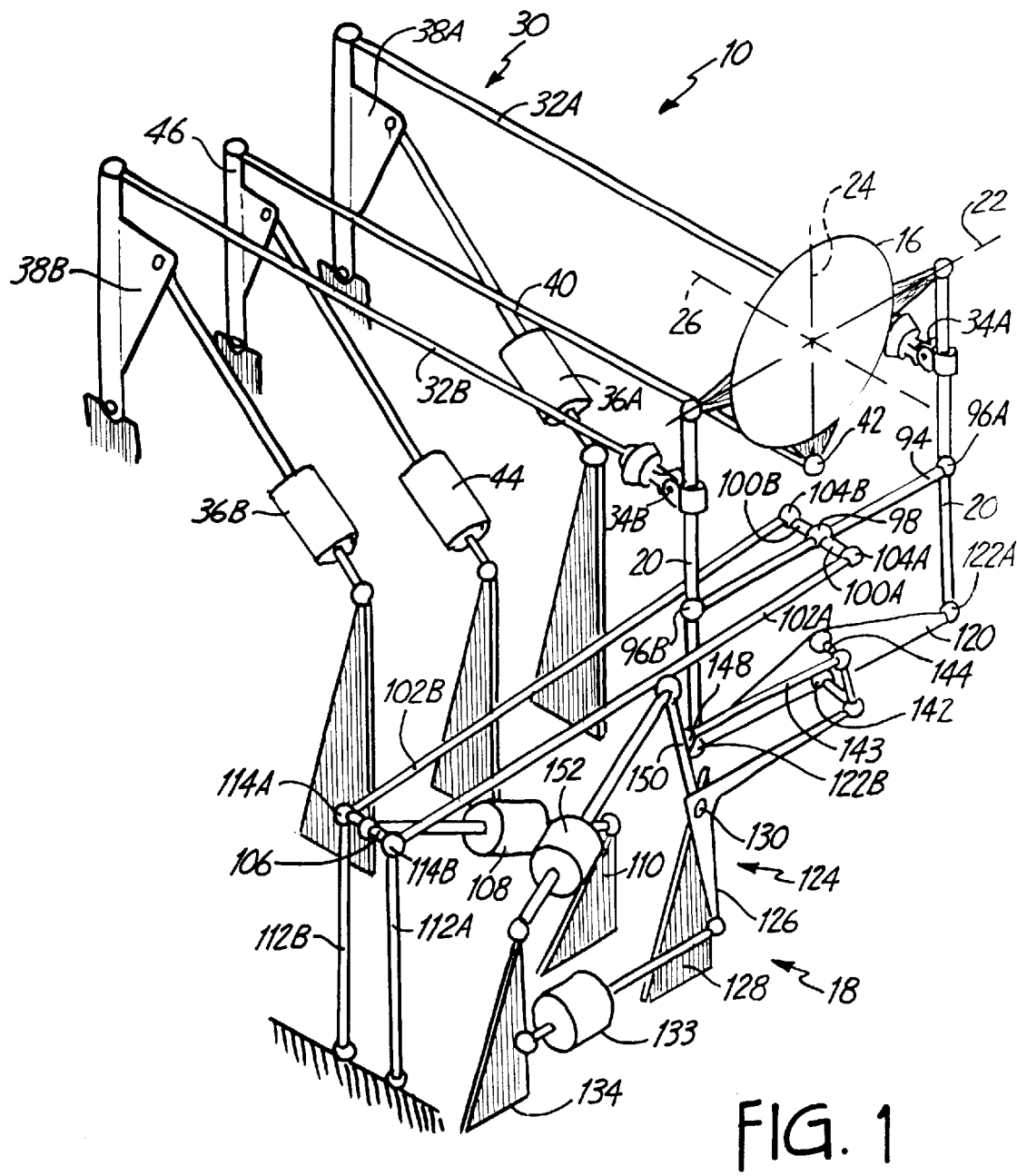
FIG. 1 is a schematic representation of a vehicle spindle test fixture including a loading assembly of the present invention.
Figure 2:
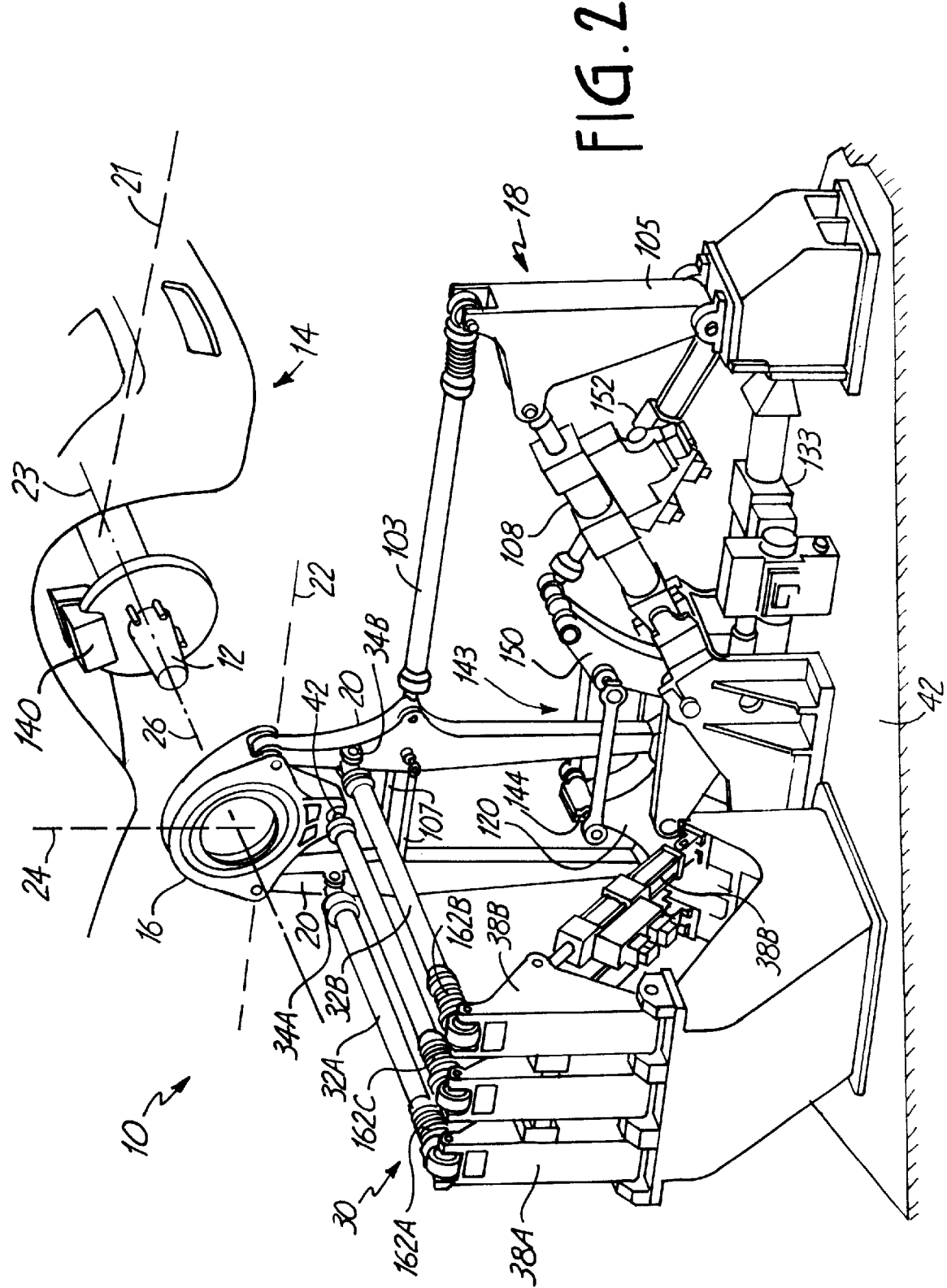
FIG. 2 is a perspective view of the vehicle spindle test fixture including the loading assembly of the present invention.

Referring to FIG. 1 and the schematic representation thereof, a vehicle spindle test fixture is indicated generally at 10 and is designed for applying linear force and rotational moments to a spindle 12 of a vehicle 14, illustrated in FIG. 2. The vehicle spindle test fixture 10 includes a wheel adapter housing 16 that is fixed to the vehicle spindle 12 in a conventional manner. A first loading assembly 18 is joined to the wheel adapter housing 16 using a pair of vertically extending loading links or struts 20. Generally, the first loading assembly 18 applies loads to the wheel adapter housing 16, and thus the spindle 12, in directions along two mutually perpendicular axes 22 and 24. In addition, the first loading assembly 18 applies a moment or torque about an axis 26 that is mutually perpendicular to axes 22 and 24. Although the first loading assembly 18 will be described briefly below, the loading assembly 18 is similar in construction and operation to similar components in the test fixture described in U.S. Pat. No. 5,083,453, which is hereby incorporated by reference.

As used herein, the following definitions for forces and moments about the axes 22, 24 and 26 will apply: a "longitudinal force" is force applied to the wheel adapter housing 16 generally parallel to the axis 22, the axis 22 being parallel to a longitudinal axis 21 of the vehicle 14 (FIG. 2); a "vertical force" is a force to the wheel adapter housing 16 generally along the axis 24; a "lateral force" is a force applied to the vehicle adapter housing 16 generally parallel to the axis 26, which is parallel to an axis 23 of the spindle 12 (FIG. 2); a "braking moment" is a moment applied to the vehicle adapter housing 16 generally about the axis 26; a "steer moment" is a moment applied to the vehicle adapter housing 16 generally about the axis 24; and a "camber moment" is a moment applied to the vehicle adapter housing 16 generally about the axis 22.

A second loading assembly 30, constituting a first embodiment of the present invention, applies one or any combination of a lateral force, a steer moment and a camber moment to the wheel adapter housing 16. The second loading assembly 30 includes a plurality of struts illustrated at 32A and 32B. The struts 32A and 32B are joined to the vertical struts 20 with bearings (e.g. horizontally oriented trunnion joint) 34A and 34B provided on ends thereof. In one embodiment, pivotal connections 34A and 34B of the vertical struts 20 to the wheel adapter housing 16 are substantially inline with the each other and the spindle axis.

At ends opposite the wheel adapter housing 16, the struts 32A and 32B are coupled to dual-acting actuators 36A and 36B, respectively. The actuators 36A and 36B (and the other actuators described below) can be hydralic, pneumatic or electromagnetic. In the embodiment illustrated, bell cranks 38A and 38B are provided. In an alternate embodiment illustrated in FIG. 3, the bell cranks 38A and 38B can be removed with the actuators 34A and 34B directly coupled to the struts 32A and 32B, respectively. If desired, the actuators 36A and 36B can be connected to struts 32A and 32B without the hinged or pivot mechanisms shown, although a less compact structure might be realized.

A third lateral strut is pivotally joined to the wheel adapter housing 16 on a downwardly extending tang 41 with a spherical bearing 42. At an end opposite the wheel adapter housing 16, the strut 40 is operably coupled to a dual-acting actuator 44. In the embodiment illustrated, a bell crank 46 is provided. If desired, the bell crank 46 can be removed with the actuator 44 directly coupled to the strut 40. In one embodiment, the pivotal connections of the pair of lateral struts 32A and 32B to the vertical struts 20 and the pivotal connection of the third lateral strut 40 to the wheel adapter housing 16 are substantially inline with each other, although they need not be inline. Preferably, the pivotal connections of the struts 32A and 32B to the vertical struts 20 and the pivotal connection of the third lateral strut 40 to the wheel adapter housing 16 are disposed below the spindle axis. In one embodiment, the pivotal connection of the strut 40 to the wheel adapter housing 16 is at approximately the emulated tire contact patch with the road. This increases the clearance distance between the struts 32A, 32B and 40 the fender well sheet metal of the vehicle, allowing for greater travel.

As stated above, the loading assembly 30 applies one or any combination of a lateral force, a steer moment and a camber moment to the wheel adapter housing 16. In the embodiment illustrated in FIGS. 1–3, a lateral force is applied when actuators 36A, 36B and 44 are operated to simultaneously apply substantially the same force vectors (wherein a "vector" comprises a force or magnitude and a direction) substantially parallel to the axis 26. A "steer" moment is applied when a difference exists between the vectorial sum of forces provided by the actuators 36A and 36B through struts 32A and 32B. A "camber" moment is induced when a difference exists between the vectorial sum of the forces provided by the actuators 36A and 36B, through struts 32A and 32B and through struts 20, and the force provided by the actuator 44 through strut 40.

Figure 3:
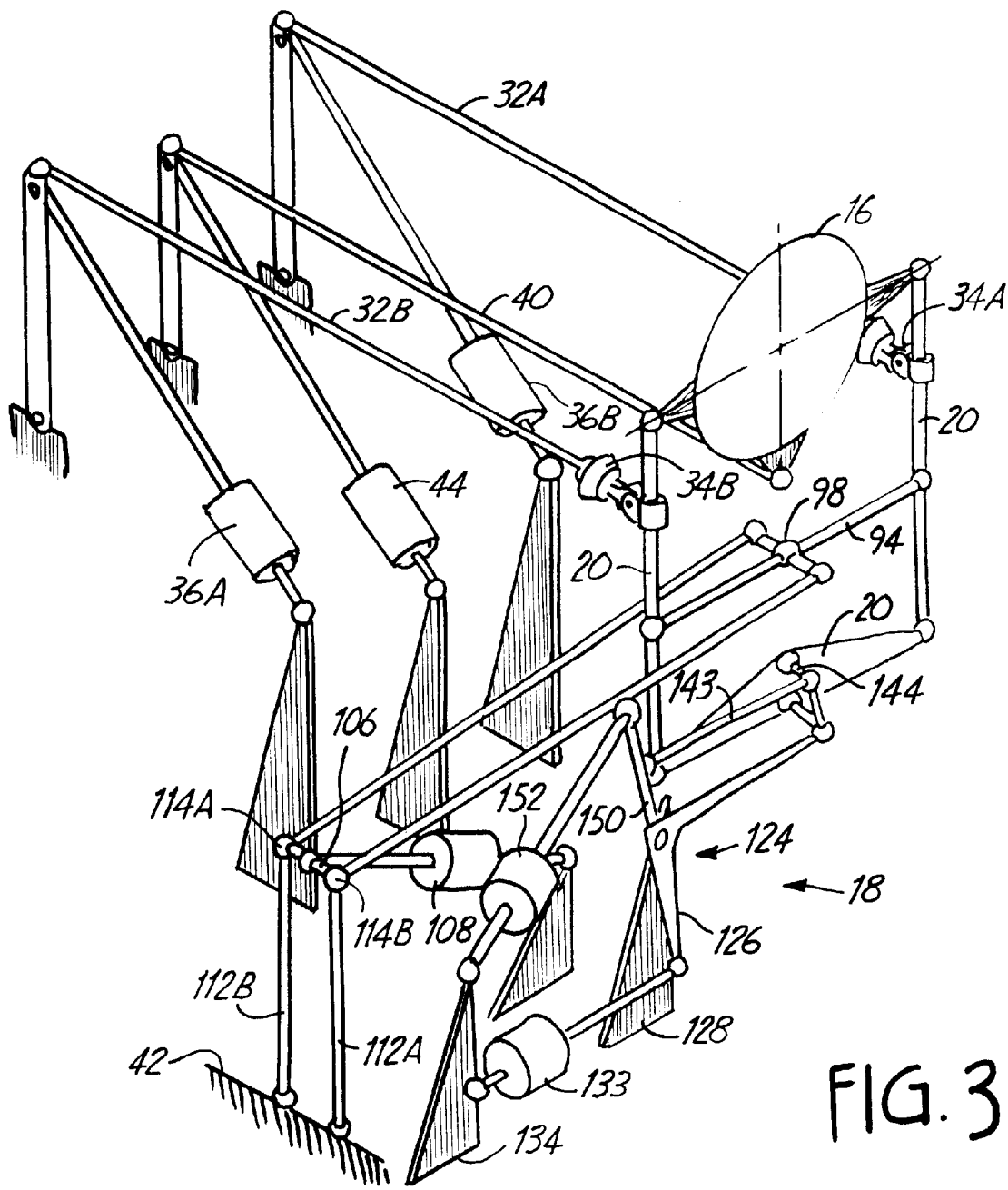
FIG. 3 is a schematic representation of a second embodiment of a loading assembly of the present invention.

It should be understood that the embodiment of FIGS. 1–3 is capable of applying the lateral force, a steer moment and a camber moment. However, in some applications, a loading assembly to apply all three loads (a lateral force, a steer moment and a camber moment) may not be necessary. For instance, in another embodiment, it may not be necessary to apply a camber moment, thus, actuator 44 and strut 40 can be removed wherein a lateral force and a steer moment are applied through struts 32A and 32B, using actuators 34A and 34B, as described above.

Figure 4:
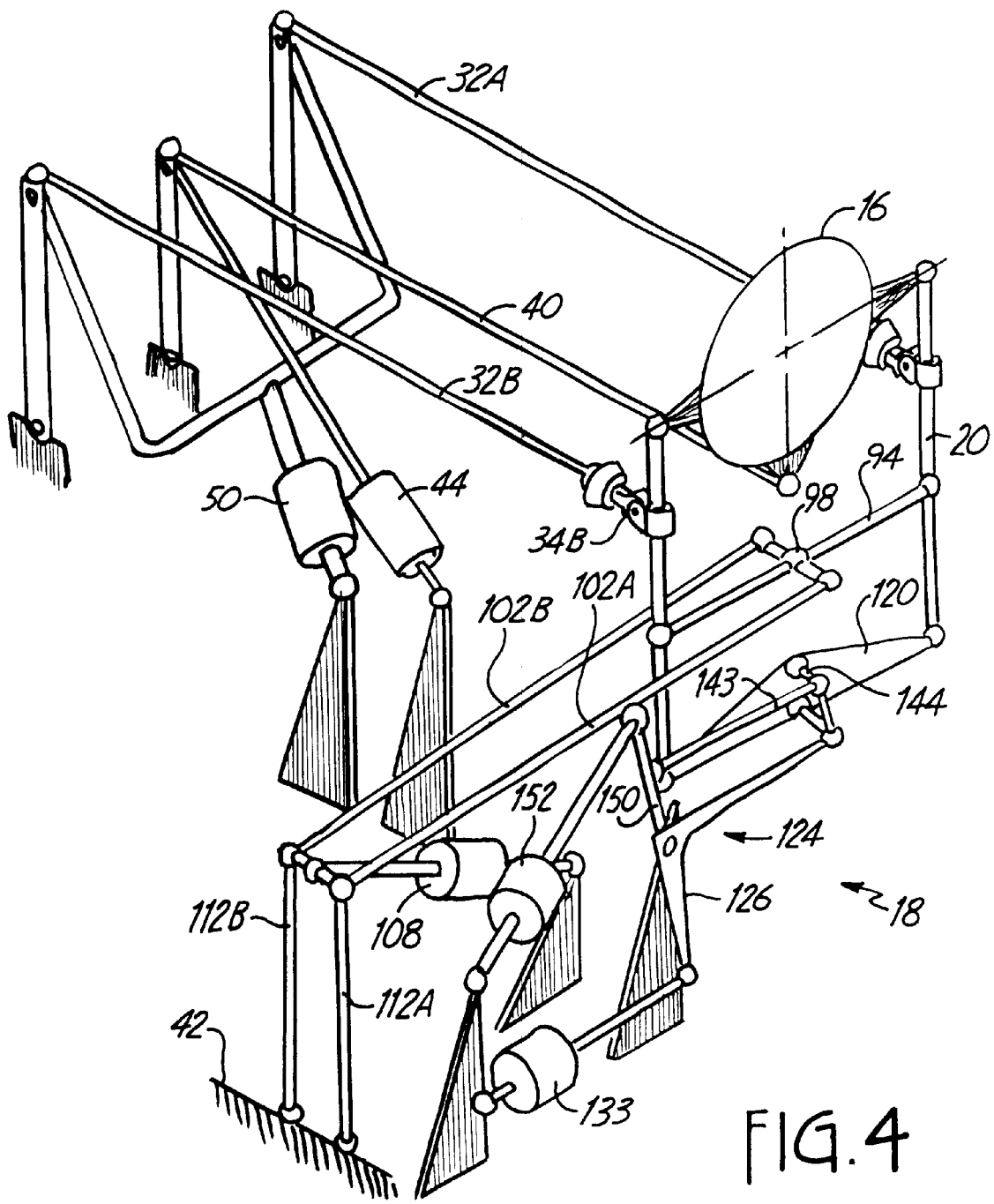
FIG. 4 is a schematic representation of a third embodiment of a loading assembly of the present invention.

In yet a further alternative embodiment, a steer moment may not be necessary. Referring to FIG. 4, a single dual-acting actuator 50 is provided and coupled to both struts 32A and 32B. In this manner, a lateral force is applied through simultaneous operation of actuators 44 and 50, while a camber moment can be applied when a difference exists in a vectorial sum of forces from actuators 44 and 50.

Figure 5:
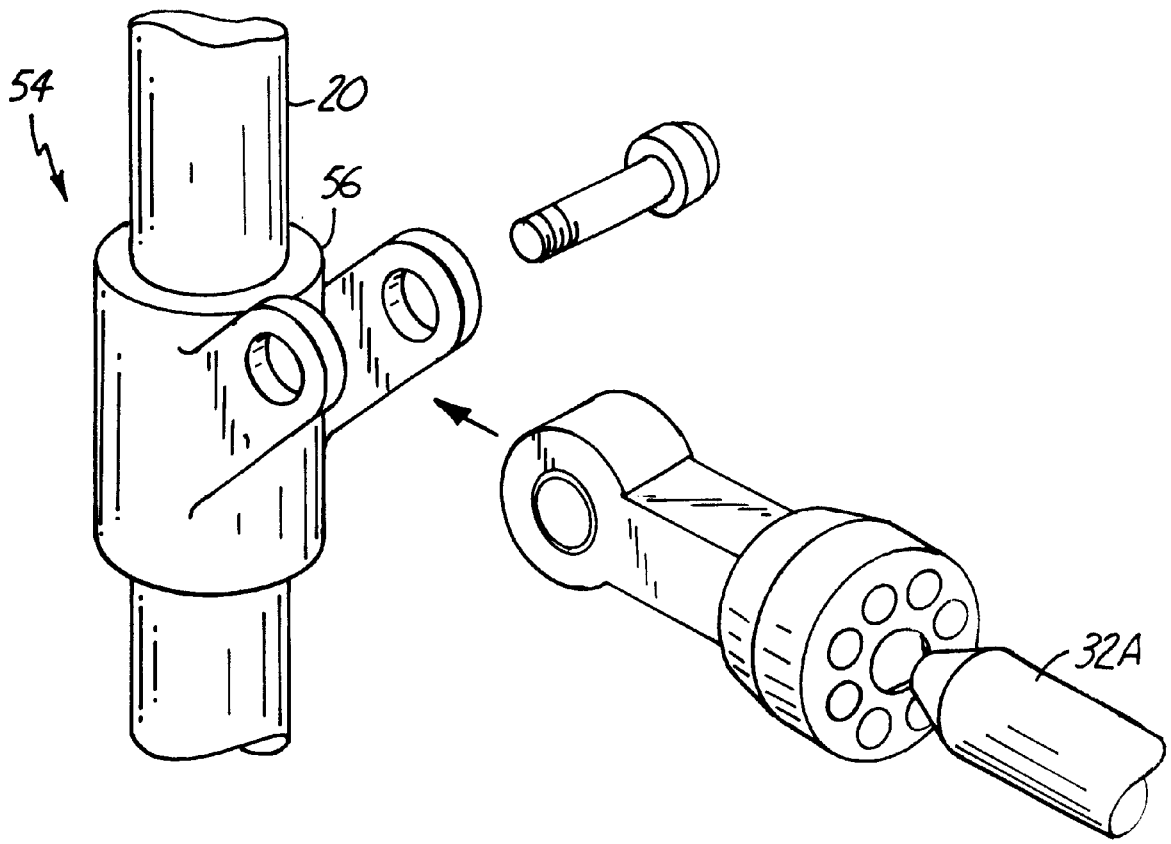
FIG. 5 is an enlarged perspective view of a portion of the loading assembly.

In the embodiment of FIGS. 1–3, stationary or fixed bearings are provided to connect the struts 32A and 32B to the vectorial strut 20. Referring to FIG. 5, an alternative connection mechanism 54 is illustrated. In this embodiment, the struts 32A and 32B (strut 32A is shown by way of example) is pivotally connected to a collar 56 that, in turn, is secured to the vertical strut 20. In one embodiment, the collar 56 can be adjustable. For instance, the collar 56 can be a clamping device, as shown, that is slidable on the vertical strut 20 and can be clamped thereon to secure it in position. Alternatively, separate fasteners, such as bolts, can be extended through the collar 56 and through apertures provided in the vertical strut 20 to selectively secure the collar 56 in any one of a plurality of positions.

As stated above, the vertically extending struts 20 apply forces from the first loading assembly 18. In the embodiment of FIG. 3, the vertical struts 20 are coupled together in their mid-portions with a crosslink 94 that has at its opposite ends spherical bearings designated at 96A and 96B. The crosslink 94 has a center spherical bearing 98 with struts 100A and 100B extending therefrom. Each of the struts 100A and 100B is connected to longitudinal struts 102A and 102B, respectively, using spherical bearings 104A and 104B, respectively. A crosslink 106 joins the longitudinal links 102A and 102B together at ends opposite the crosslink 94. A dual-acting actuator 108 joined at a first end to a support structure 110 is connected to the crosslink 106. Pivot arms 112A and 112B support the crosslink 106 above a base or support frame 42. Spherical bearings 114A and 114B are provided to connect the longitudinal links 102A and 102B to the pivot arms 112A and 112B, respectively. In similar fashion, a spherical bearing is also provided for connecting the actuator 108 to the crosslink 106, and connection of the pivot arms 112A and 112B to the support frame 42. Operation of the actuator 108 provides a longitudinal force to the wheel adapter housing 16.

The embodiment of FIG. 2 illustrates an alternate mechanism for applying a longitudinal load. In this embodiment, a single longitudinal strut 103 is joined at a first end to one of the vertical struts 20, and joined at a second end to a bell crank 105 that in turn is connected to the actuator 108. Parallel links 107 interconnect the vertical struts 20 together. Suitable bearings are provided to allow the vertical struts 20 to move relative to each other.

Referring back to FIG. 1, the lower end of the vertical loading struts 20 are joined with a delta-shaped (triangular) bell crank 120 that is mounted between spherical bearings 122A and 122B of the vertical struts 20. The bell crank 120 is movable in a vertical direction to apply a vertical force to the wheel adapter housing 16 through the vertical struts 20. The bell crank 120 is mounted on a bell crank arm assembly 124. The bell crank arm assembly 124 has an actuating arm portion 126 and is supported by a support structure 128 with a pivot pin 130. The bell crank assembly 124 is joined to the bell crank 120 with a suitable connecting strut 132. A dual-acting actuator 13 connected between a support structure 134 and the actuating portion 126 applies vertical forces to the bell crank assembly 124 which in turn are transmitted to the bell crank 120.

In order to apply a braking moment on the wheel adapter housing 16, it is necessary to put a torque load on the wheel adapter housing 16 when a brake 140 (FIG. 2) is being clamped. The braking moment is applied by pivoting the bell crank 120 about a central spherical pivot 142 in order to cause differential vertical movement of the vertical struts 20. A suitable control link 144 is pivotally connected to the bell crank 120, at a point that is spaced apart from a line passing through spherical bearings 122A and 122B. A link 143 is pivotally mounted as at 148 to an actuator lever 150. The actuator lever 150 has one end pivotally mounted to the support structure 128. A dual-acting actuator 152 connected between the actuator lever 150 and the support structure 134 pivots the actuator lever 150 in order to pivot the bell crank 120 about the center spherical bearing 142. As stated above, the first loading assembly 18 is similar to the corresponding portion of the test fixture described in U.S. Pat. No. 5,083, 453. In the embodiment illustrated in FIG. 3, the actuators 108, 133 and 152 are located generally in the same plane. Placement of the actuators 133 and 152 however has been switched with the bell crank assembly 124 and the bell crank 120 being correspondingly inverted, but not shown, since the first loading assembly 18 is not part of the present invention.

Load cells 162A, 162B and 162C are provided in the struts 32A, 32B and 32C to measure loads transmitted therethrough and provide representative electric signals to a controller, not shown, in order to calculate the lateral force, the steer moment and the camber moment on the vehicle spindle 12. A wheel force transducer, such as described in U.S. patent application Ser. No. 08/892,914 can be mounted to the wheel adapter housing 16 and the spindle 12. The wheel force transducer measures loads for each axis in the vehicle suspension. Alternatively, the suspension can be instrumented directly as is well-known in the art.

Figure 6:
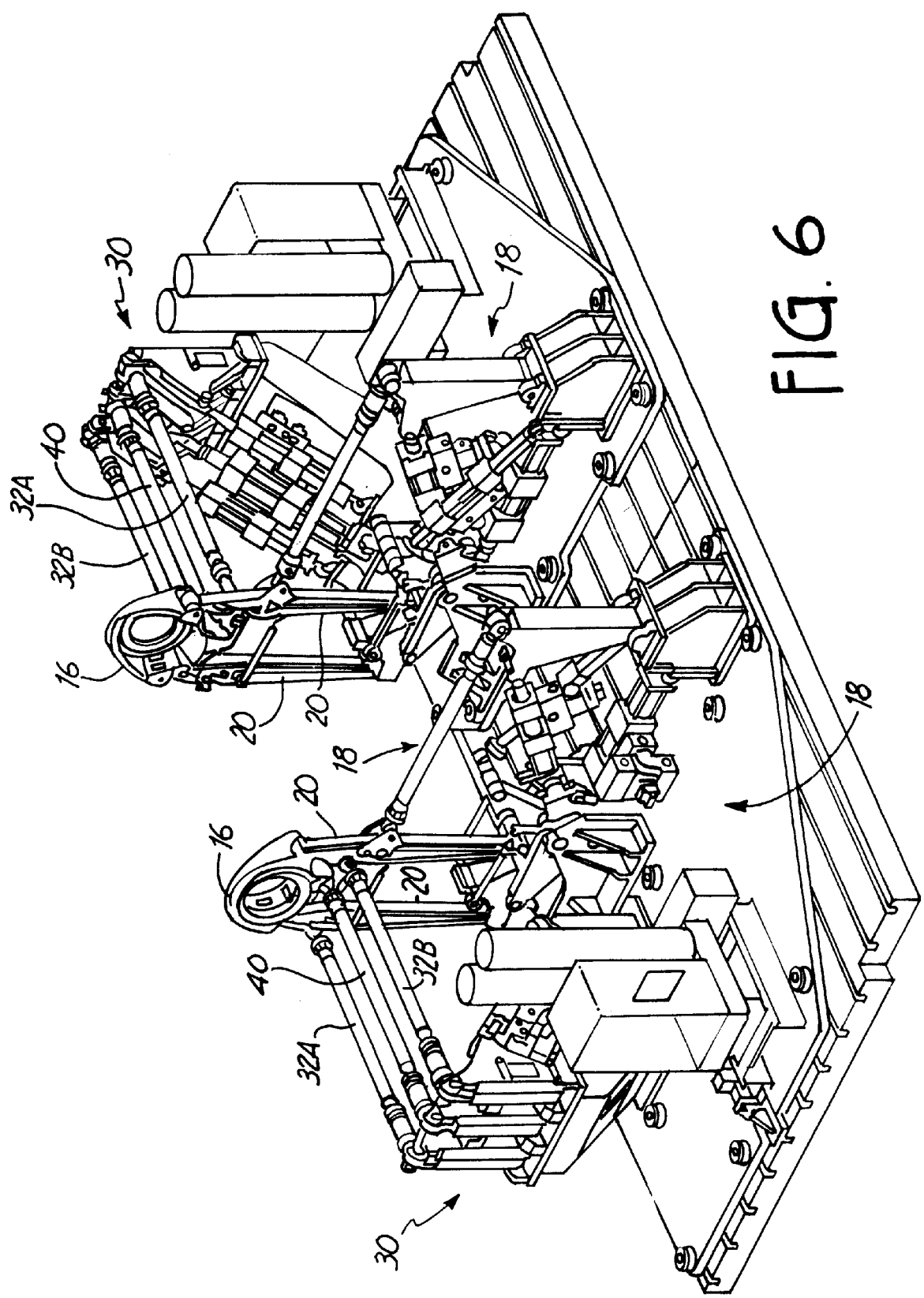
FIG. 6 is a perspective view of a two spindle test fixtures.

FIG. 6 illustrates two vehicle test fixtures 10 for use on spindles of a single axle.

Although the present invention has been described with reference to preferred embodiments, workers skilled in the art will recognize that changes may be made in form and detail without departing from the spirit and scope of the invention.

What is claimed is:

1. A loading assembly used in a vehicle spindle test fixture to apply a lateral force parallel to a spindle axis of a vehicle spindle and wherein a vertical axis is substantially perpendicular to the spindle axis and substantially perpendicular to a longitudinal axis of the vehicle, the loading assembly comprising:

a support frame;

a wheel adapter housing mountable to the vehicle spindle;

a pair of vertical struts, each vertical strut being pivotally joined to the wheel adapter housing;

a first actuator operably coupled to the vertical struts to apply a force along the vertical axis;

a pair of lateral struts, each lateral strut being pivotally joined to one of the vertical struts;

a second actuator operably coupled to one of the lateral struts to apply a lateral force; and a third actuator operably coupled to the other lateral strut wherein a difference of a vectorial sum of forces from the second and third actuators induces a steer moment about the vertical axis.

2. The loading assembly of claim 1 and further comprising:

a third lateral strut being pivotally joined to the wheel adapter housing; and a fourth actuator operably coupled to the third lateral strut to apply a lateral force.

3. The loading assembly of claim 2 wherein a difference of a vectorial sum of forces from the fourth actuator, the second actuator and the third actuator induces a moment about an axis substantially perpendicular to the spindle axis and substantially perpendicular to the vertical axis.

4. The loading assembly of claim 3 wherein pivotal connections of the pair of lateral struts to the vertical struts and the pivotal connection of the third lateral strut to the wheel adapter are disposed below the spindle axis.

5. The loading assembly of claim 3 and further comprising:

a first bell crank pivotal on the support frame and operably coupling the second actuator to said one of the lateral struts;

a second bell crank pivotal on the support frame and operably coupling the third actuator to said other of the lateral struts; and a third bell crank pivotal on the support frame and operably coupling the fourth actuator to third lateral strut.

* * * * *